(12) United States Patent
Ushio

(10) Patent No.: US 7,732,074 B2
(45) Date of Patent: Jun. 8, 2010

(54) FUEL CELL SYSTEM

(75) Inventor: Takeshi Ushio, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1514 days.

(21) Appl. No.: 11/059,447

(22) Filed: Feb. 16, 2005

(65) Prior Publication Data

US 2005/0233191 A1    Oct. 20, 2005

(30) Foreign Application Priority Data

Apr. 20, 2004    (JP) ............................. 2004-123991

(51) Int. Cl.
*H01M 8/04*    (2006.01)
*H01M 8/06*    (2006.01)

(52) U.S. Cl. .............................. 429/26; 429/20; 429/22; 429/23

(58) Field of Classification Search .................. 429/20, 429/23, 24, 26
See application file for complete search history.

(56) References Cited

U.S. PATENT DOCUMENTS 6,277,508 B1    8/2001  Reiser et al.

2002/0048697 A1    4/2002  Anumu et al.
2004/0062975 A1    4/2004  Yamamoto et al.

FOREIGN PATENT DOCUMENTS

| EP | 0 246 649 A1 | 11/1987 |
| JP | 07-094202 | 4/1995 |
| JP | 2001-118593 | 4/2001 |
| JP | 2002-289237 | 10/2002 |
| JP | 2003-243009 | 8/2003 |

*Primary Examiner*—Tracy Dove
(74) *Attorney, Agent, or Firm*—Fish & Richardson P.C.

(57) ABSTRACT

The fuel cell system is equipped with a fuel cell for generating power by chemically reacting a fuel gas supplied to an anode and an oxygen containing gas supplied to a cathode; an anode off-gas discharge mechanism for discharging an anode off-gas from the anode; a combustion heater for combusting a combustion gas; a dilution mechanism for diluting the anode off-gas by the oxygen containing gas; a first path for introducing the anode off-gas into the combustion heater; a first flow rate adjustment mechanism for adjusting an introduction amount of the anode off-gas into the first path; a second path for introducing the anode off-gas into the dilution mechanism; a second flow rate adjustment mechanism for adjusting an introduction amount of the anode off-gas into the second path; and a control mechanism for controlling actuations of the first flow rate adjustment mechanism and the second flow rate adjustment mechanism.

6 Claims, 9 Drawing Sheets

FUEL CELL SYSTEM

BACKGROUND OF THE INVENTION

1. Field of the Invention

The present invention relates to a fuel cell system for warming up a fuel cell by combusting an anode off-gas.

2. Description of the Related Art

These years a fuel cell electric vehicle (FCEV) is noticed from a viewpoint of suppressing a discharge amount of carbon dioxide causing global warming and the like. The FCEV mounts a fuel cell (FC) for generating power by electrochemically reacting hydrogen (H2) and oxygen (O2), supplies electric power generated by the fuel cell to a traction motor, and produces driving force.

In this connection, the fuel cell brings out its performance at a certain temperature. For example, in a proton exchange membrane (PEM) fuel cell the temperature is about 80 degrees Celsius, and if the temperature is lower, a power generation performance (electromotive force) is lowered. Therefore, when activating an FECV in winter or a cold district, it is necessary to warm up the fuel cell (that is, to heat up or warm the fuel cell to a predetermined temperature).

Conventionally, in warming up the fuel cell are taken following methods: For example, there is a method of additionally providing the fuel cell with an electric heater, making the electric heater generate heat by a battery mounted on the FCEV, and warming up the fuel cell by the heat (for example, see a paragraph 0038 and FIG. 3 of Japanese Patent Laid-Open Publication Hei. 7-94202 (hereinafter referred to as patent document 1)). In addition, there is another method of additionally providing the fuel cell with a combustion heater (catalyst combustor and the like), supplying hydrogen, methanol, gasoline, and the like mounted as fuel by the FCEV to the combustion heater, combusting them, and warming up the fuel cell by combustion heat thereof (for example, see a paragraph 0034 and FIG. 1 of Japanese Patent Laid-Open Publication No. 2001-118593 (hereinafter referred to as patent document 2)).

On the other hand, in a fuel cell equipped with a fuel cell circulation path for recirculating a fuel gas out of fuel cells, because water produced at a cathode moves to an anode through a membrane together with power generation, a flow passage of the anode is occluded by water, and similarly a nitrogen gas and the like move from the cathode to the anode through the membrane, it cannot be avoided that impurities are accumulated in the fuel cell circulation path. Therefore, in order to stably generate power by this kind of a fuel cell, there is a fuel cell that discharges the fuel gas of the fuel cell circulation path as an anode off-gas from a discharge side path (that is, performs purging and sweeping), depending on a state within the fuel cell, mixes and dilutes the fuel gas with a cathode off-gas, then combusts it by a catalyst combustor, and discharges it in an atmosphere (for example, see paragraphs 0063 to 0065 and FIG. 1 of Japanese Patent Laid-Open Publication No. 2002-289237 (hereinafter referred to as patent document 3)). In addition, there is also a fuel cell that combusts reaction-remaining hydrogen discharged from the anode of the fuel cell and a hydrogen gas from a hydrogen tank together with air by a catalyst combustor and performs a warm-up by supplying a combustion heat thereof to the fuel cell through a coolant circulation path (for example, see paragraphs 0022 to 0024 and FIG. 1 of Japanese Patent Laid-Open Publication No. 2003-243009 (hereinafter referred to as patent document 4)).

However, in an apparatus of the patent document 1 it is not preferable to consume electric power of a vehicle-mounted battery for an electric heater for a warm-up, and moreover, there is a case that sufficient electric power is not supplied from the vehicle-mounted battery in a low temperature when electromotive force becomes lower. In addition, when using a commercial power source, there is a problem that a warm-up cannot be performed at a place such as a road where there is no commercial power source. In an apparatus of the patent document 2, because a hydrogen combustor and the like consume hydrogen (raw fuel) used for power generation, there is a problem that a fuel consumption of the fuel cell results in being exacerbated.

On the other hand, in an apparatus of the patent document 3, although a hydrogen concentration of an anode off-gas can be reduced to a safe level by a dilution and a combustion and the anode off-gas can be discharged, there is a problem that an energy efficiency lowers because a thermal energy produced by the combustion of a catalyst combustor is discharged in an atmosphere and a warm-up of the fuel cell has to be performed by a heating mechanism such as an electric heater. In addition, in an apparatus of the patent document 4, when an introduction hydrogen amount into a catalyst combustor is limited, a needed amount of reaction-remaining hydrogen results in not being discharged, an operation state of the fuel cell system becomes unstable, and there is a possibility that a lowering of a power output and the like occur. In addition, an excess of humidifying water and a moisture reversely diffusing into the anode from the cathode mix with the reaction-remaining hydrogen, these moistures are introduced in a liquid state, and thereby there is also a possibility that a combustion in a catalyst combustor results in becoming unstable.

Consequently, a fuel cell system is strongly requested that performs a speedy warm-up by an anode off-gas without obstructing a stable operation of the fuel cell system.

SUMMARY OF THE INVENTION

A fuel cell system of a first aspect to solve the problems described above is the system that comprises a fuel cell for generating power by chemically reacting a fuel gas supplied to an anode and an oxygen containing gas supplied to a cathode; an anode off-gas discharge mechanism for discharging an anode off-gas from the anode; a combustion heater for combusting a combustion gas containing at least one of the anode off-gas and the fuel gas together with the oxygen containing gas, using a thermal energy obtained by the combustion, and heating the fuel cell; a dilution mechanism for diluting the anode off-gas by the oxygen containing gas; a first path for introducing the anode off-gas into the combustion heater; a first flow rate adjustment mechanism for adjusting an introduction amount of the anode off-gas into the first path; a second path for introducing the anode off-gas into the dilution mechanism; a second flow rate adjustment mechanism for adjusting an introduction amount of the anode off-gas into the second path; and a control mechanism for controlling actuations of the first flow rate adjustment mechanism and the second flow rate adjustment mechanism.

In accordance with the fuel cell system of the first aspect, for example, in a warm-up after a start-up the anode off-gas is introduced into the combustion heater, and the fuel cell is warmed up; and in a completion of the warm-up the anode off-gas is diluted to a concentration not more than a combustible limit by the dilution mechanism and is discharged in an atmosphere.

In addition, a fuel cell system of a second aspect further comprises, in the system of the first aspect, a third path for introducing the fuel gas into the combustion heater; a third flow rate adjustment mechanism for adjusting an introduction amount of the fuel gas into the third path, wherein the control mechanism controls actuations of the third flow rate adjustment mechanism.

In accordance with the fuel cell system of the second aspect, for example, when an amount of an anode off-gas runs short, the fuel gas is introduced into the combustion heater, and the fuel cell is warmed up.

A fuel cell system of a third aspect further comprises, in the system of any of the first and second aspects, a temperature detection mechanism for detecting a temperature of the fuel cell, wherein when the temperature of the fuel cell is lower than a first predetermined temperature, the control mechanism makes an introduction amount of the anode off-gas into the first path more than that into the second path, and wherein when the temperature of the fuel cell is higher than the first predetermined temperature, the control mechanism makes an introduction amount of the anode off-gas into the second path more than that into the first path.

In accordance with the fuel cell system of the third aspect, for example, in a warm-up after a start-up a comparatively large amount of the anode off-gas is introduced into the combustion heater; and in a completion of the warm-up the comparatively large amount of the anode off-gas is introduced into the dilution mechanism.

In addition, a fuel cell system of a fourth aspect further comprises, in the system of any of the first to third aspects, a fuel supply limit amount set mechanism for setting a limit value of an introduction amount of the anode off-gas into the first path, wherein when an anode off-gas discharge amount by the anode off-gas discharge mechanism exceeds the limit value, the control mechanism introduces an amount of an anode off-gas obtained by subtracting the limit amount from the discharge amount into the dilution mechanism.

In accordance with the fuel cell system of the fourth aspect, when the fuel cell system reaches a temperature of being able to warm up by itself, the fuel supply limit amount set mechanism sets as the limit value, for example, the amount of the anode off-gas in a range of not overshooting the temperature of the fuel cell.

In addition, a fuel cell system of a fifth aspect further comprises, in the system of any of the first to fourth aspects, a request fuel amount set mechanism for setting a request supply amount of a combustion gas to the combustion heater, wherein when an anode off-gas discharge amount by the anode off-gas discharge mechanism does not satisfy the request supply amount, the control mechanism introduces a fuel gas amount obtained by subtracting the discharge amount from the request supply amount into the third path.

In accordance with the fifth aspect of the fuel cell system, for example, the request fuel amount set mechanism sets the combustion gas amount for warming up the fuel cell in time as short as possible in a range of not obstructing an operation of the fuel cell system.

In addition, a sixth aspect of a fuel cell system sets, in the system of any of the first to fifth aspects, any of a flow rate of the oxygen containing gas supplied to the combustion heater and a refrigerant flow rate of a fuel cell cooling loop heated by the combustion heater, based on any of a request supply amount and actual flow rate of a combustion gas to the combustion heater.

In accordance with the fuel cell system of the sixth aspect, for example, when an amount of a cathode off-gas is less than that of an anode off-gas, new air is introduced into the combustion heater from an air pump in order to combust at an adequate mix ratio within the combustion heater.

In addition, a fuel cell system of a seventh aspect further comprises, in the system of any of the first to sixth aspects, at least one of a gas/water separator for removing a moisture in the anode off-gas introduced into the combustion heater and another gas/water separator for removing a moisture in the oxygen containing gas introduced into the combustion heater.

In accordance with the fuel cell system of the seventh aspect, the moisture is removed by the gas/water separator from the anode off-gas discharged from the anode and the cathode off-gas discharged from the cathode, and then the anode off-gas and the cathode off-gas are introduced into the combustion heater.

In addition, a fuel cell system of an eighth aspect is the system that comprises a fuel cell for generating power by chemically reacting a fuel gas supplied to an anode and an oxygen containing gas supplied to a cathode; an anode off-gas discharge mechanism for discharging an anode off-gas from the anode; a combustion heater for combusting a combustion gas containing at least one of the anode off-gas and the fuel gas together with the oxygen containing gas, using a thermal energy obtained by the combustion, and heating the fuel cell; a dilution mechanism for diluting the anode off-gas by the oxygen containing gas; a first path for introducing the anode off-gas into the combustion heater; a first flow rate adjustment mechanism for adjusting an introduction amount of the anode off-gas into the first path; a second path for introducing the anode off-gas into the dilution mechanism; a second flow rate adjustment mechanism for adjusting an introduction amount of the anode off-gas into the second path; and a control mechanism for controlling actuations of the first flow rate adjustment mechanism and the second flow rate adjustment mechanism, wherein a cathode off-gas discharged from the fuel cell is introduced into the combustion heater as the oxygen containing gas, the dilution mechanism is provided at a downstream of the combustion heater, and a discharge gas discharged from the combustion heater flows in the dilution mechanism.

In accordance with the fuel cell system of the eighth aspect, for example, in a warm-up after a start-up the anode off-gas and the cathode off-gas are introduced into the combustion heater, the fuel cell is warmed up, and the discharge gas is discharged in an atmosphere via the dilution mechanism. In addition, in a completion of the warm-up the anode off-gas directly introduced into the dilution mechanism is diluted to a concentration not more than the combustible limit the cathode off-gas flowing in the dilution mechanism via the combustion heater and is discharged in the atmosphere.

In addition, a fuel cell system of a ninth aspect comprises, in the system of the eighth aspects, at least one of a gas/water separator for removing a moisture in the anode off-gas introduced into the combustion heater and another gas/water separator for removing a moisture in the cathode off-gas introduced into the combustion heater.

In accordance with the fuel cell system of the ninth aspect, the moistures are removed by the gas/water separator from the anode off-gas discharged from the anode and the cathode off-gas discharged from the cathode, and then the anode off-gas and the cathode off-gas are introduced into the combustion heater.

DESCRIPTION OF THE PREFERRED EMBODIMENTS

Here will be described some embodiments where the present invention is applied to a fuel cell electric vehicle in detail, referring to drawings. Although each embodiment is different in a control mode thereof, configurations of a vehicle and a fuel cell system are same.

Embodiment

[Configuration of Vehicle]

Figure 1:
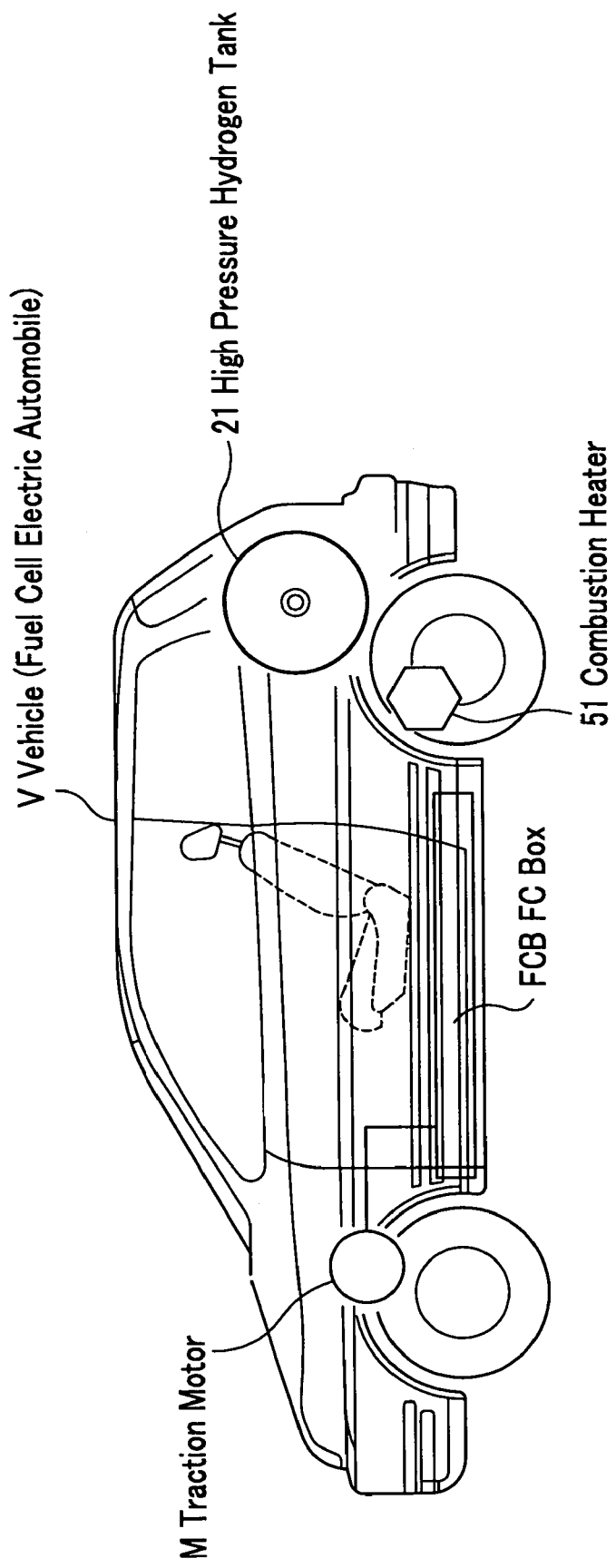
FIG. 1 is a partial perspective side view of a vehicle where a fuel cell system of an embodiment of the present invention is mounted.

Firstly will be described a vehicle. In a vehicle V shown in FIG. 1 an FC box FCB is mounted under a floor of a passenger's seat, and in the FC box FCB is housed a fuel cell 10 (see FIG. 2). In addition, a traction motor M is mounted at a front of the vehicle V, and a high pressure hydrogen tank 21 is horizontally mounted above rear wheels of the vehicle V. In addition, below the vehicle V a combustion heater 51 is mounted between the FC box FCB and the high pressure hydrogen tank 21. And heat generated by the combustion heater 51 warms up the fuel cell 10 through a coolant flowing within a cooling loop (not shown) of the fuel cell 10.

Figure 2:
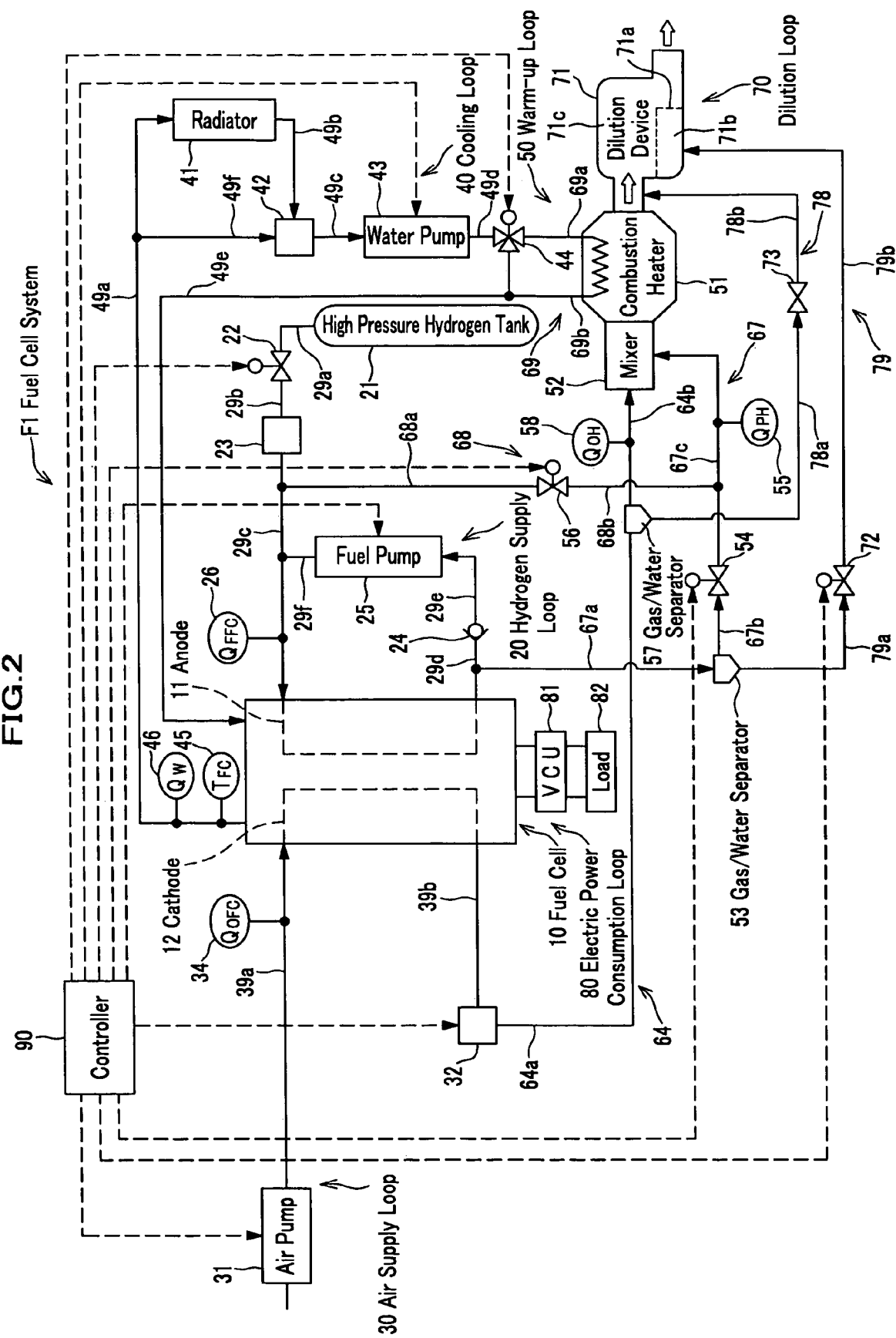
FIG. 2 is a configuration block diagram of a fuel cell system of an embodiment of the present invention.

The fuel cell 10 is connected to an air pump through an air supply piping (out of a range of FIG. 2). The fuel cell 10 electrochemically reacts oxygen in air and hydrogen and generates power, and electric power generated is supplied to the traction motor M and runs the vehicle V. In this connection, the fuel cell 10 here is a fuel cell of a PEM type of a solid polymer and has a stack structure of, for example, some 300 pieces of single cells being stacked, and which single cell further sandwiches by a separator an MEA configured of an anode, a cathode, and the like with sandwiching an electrolyte membrane (here described out of the range of FIG. 2). Here, the PEM is an abbreviation of Proton Exchange Membrane, and the MEA is an abbreviation of Membrane Electrode Assembly.

[Fuel Cell System Configuration]

Next will be described a fuel cell system F1, referring to FIG. 2. The fuel cell system F1 of the embodiment comprises the fuel cell 10, a hydrogen supply loop 20, an air supply loop 30, a cooling loop 40, a warming-up loop 50, a dilution loop 70, an electric power consumption loop 80, and a controller (control mechanism) 90.

The fuel cell 10 is a fuel cell of the PEM type having an anode 11 and a cathode 12 as described above; hydrogen (anode gas) of a fuel gas is supplied to the anode 11; air of an oxidizer gas is supplied to the cathode 12; and thereby the fuel cell 10 generates power. Electric power generated by the fuel cell 10 is picked up through a VCU (Voltage Control Unit) 81 of the electric power consumption loop 80. The VCU 81 is a voltage regulator having a limiter function and limits a current picked up from the fuel cell 10. The current picked up through the VCU 81 is supplied to a load 82 such as the traction motor M (see FIG. 1) and auxiliaries. Meanwhile, a current amount picked up by the VCU 81 is set, based on a tramp-on amount θth of a throttle pedal not shown, consumption electric power, and the like.

The hydrogen supply loop 20 takes charge of supplying hydrogen of a fuel gas to the anode 11 of the fuel cell 10. Therefore, in addition to the high pressure hydrogen tank 21, at an upstream side of the anode 11 are provided a shut-off valve 22 and a regulator (pressure reduction mechanism) 23. In addition, at a downstream side of the anode 11 are provided a check valve 24 and a fuel pump 25. Instruments of the hydrogen supply loop 20 are connected by fuel pipings (hydrogen supply lines) 29a to 29f, and at the fuel piping 29c is placed a flowmeter 26 for detecting a supply hydrogen amount $Q_{FFC}$ to the anode 11. Hydrogen from the high pressure hydrogen tank 21 is supplied to the anode 11 through the shut-off valve 22 and the regulator 23. In addition, an anode off-gas discharged from the anode 11 flows in the fuel pump 25 through the check valve 24, is sent to the fuel pump 25 by pressure, and is again introduced(recirculated) into the anode 11.

The air supply loop 30 takes charge of supplying air of an oxidizer gas to the fuel cell 10. Therefore, at an upstream side of the cathode 12 is provided a air pump 31, and at a downstream side of the cathode 12 is provided a back pressure valve 32. The air pump 31 is such a supercharger driven by a motor, and a rotation speed of the motor is controlled by a signal from the controller 90. In this connection, if the rotation speed of the motor is made faster, an air amount supplied to the cathode 12 of the fuel cell 10 becomes more. Instruments of the air supply loop 30 are connected by air pipings 39a and 39b, and at the air piping 39a is placed a flowmeter 34 for detecting a supply air amount $Q_{OFC}$ to the cathode 12. The back pressure valve 32 is actuated by a signal from the controller 90. Meanwhile, air supplied to the fuel cell 10 is humidified by a humidifier not shown. In this connection, because adopting a configuration of thus humidifying the air, water produced in the cathode 12 moves to the anode 11 through a membrane, then is accumulated by a hydrogen circulation in the anode 11, and tends to occlude a circulation path of the anode 11. In addition, similarly an impurity such as nitrogen moving in through the membrane also tends to be accumulated by the hydrogen circulation in the anode 11.

The cooling loop 40 takes charge of radiating heat, which the fuel cell 10 produces with accompanying a power generation, in an atmosphere. The cooling loop 40 comprises, in addition to a radiator 41, a thermostat valve 42, a water pump 43, and a three-directional solenoid valve 44. Instruments of the cooling loop 40 are connected by coolant pipings 49a to 49f, and at the coolant piping 49a are placed a temperature sensor 45 for detecting an outlet coolant temperature as a fuel cell temperature $T_{FC}$ and a flowmeter 46 for detecting a coolant flow rate $Q_W$. The thermostat valve 42 circulates a coolant without making it go through the radiator 41 when it is cold after a start-up. In addition, the three-directional solenoid valve 44 is actuated by a signal from the controller 90 and is selected to a normal operation position for directly supplying a coolant from the water pump 43 to the fuel cell 10 and to a warm-up operation position for supplying the coolant to a combustion heater 51 described later.

The warm-up loop 50 takes charge of combusting the anode off-gas and hydrogen (fuel gas) by the combustion heater 51 and warming up the fuel cell 10 with a thermal energy thereof The warm-up loop 50 comprises, in addition to the combustion heater 51, a mixer 52 for mixing the anode off-gas and cathode off-gas introduced into the combustion heater 51. To the combustion heater 51 is connected a dilution device (dilution mechanism) 71: the anode off-gas and a discharge gas of the combustion heater 51 are diluted within the dilution device 71 and then are discharged in the atmosphere.

The warm-up loop 50 comprises a first fuel gas line (first path) 67 for leading the anode off-gas to the mixer 52 (that is, the combustion heater 51), a third fuel gas line (third path) 68 for leading hydrogen to the mixer 52, a first cathode off-gas line 64 for leading the cathode off-gas to the mixer 52 (that is, the combustion heater 51), and a warm-up coolant line 69 for leading the coolant of the fuel cell 10 to the combustion heater 51.

Figure 3:
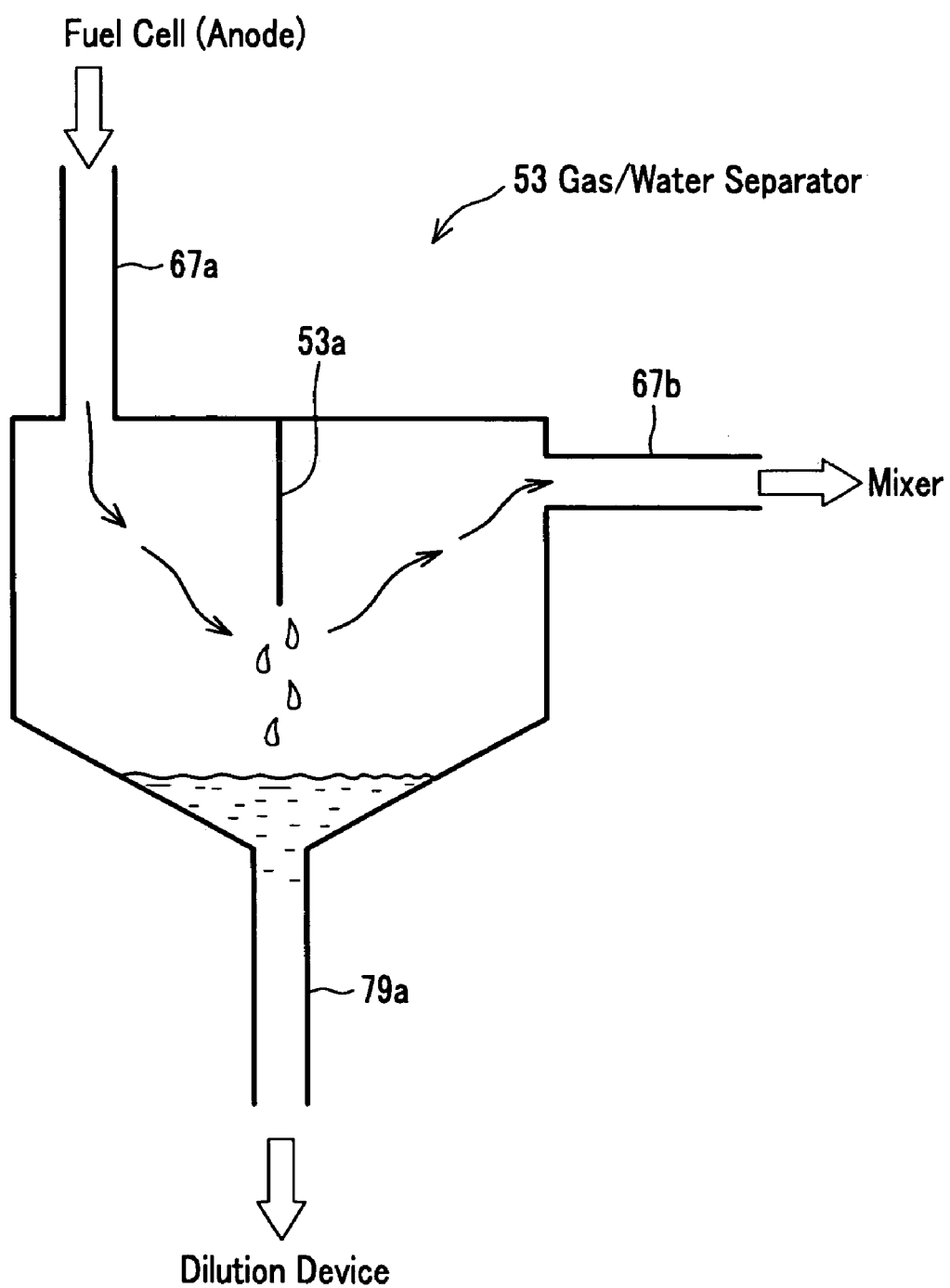
FIG. 3 is a vertical section drawing showing a structure of a gas/water separator.

The first fuel gas line 67 comprises fuel pipings 67a to 67c for communicating the fuel piping 29d at a downstream side of the anode 11 with the mixer 52, and a gas/water separator 53 and a first gas flow rate control valve (first gas flow rate adjustment mechanism, anode off-gas discharge mechanism) 54 that are connected by the fuel pipings 67a to 67c. The first gas flow rate control valve 54 is actuated by a signal from the controller 90. As shown in FIG. 3, the gas/water separator 53 is a plate type comprising a separation plate 53a therein; separates a moisture in an anode off-gas flowing in from the fuel piping 67a (that is, an anode 11 side) by the separation plate 53a; makes the anode off-gas, from which the moisture is removed, flow in the fuel piping 67b (that is, a mixer 52 side); and makes an anode off-gas containing the moisture flow in a fuel piping 79a described later (that is, a dilution device 71 side). At the fuel piping 67c is placed a flowmeter 55 for detecting a fuel gas supply amount $Q_{PH}$ to the mixer 52 (that is, the combustion heater 51).

The third fuel gas line 68 comprises fuel gas pipings 68a and 68b for communicating the fuel gas piping 29c of the hydrogen supply loop 20 with the fuel gas pipings 67c of the first fuel gas line 67 and a third gas flow rate control valve (third flow rate adjustment mechanism) 56 provided between the fuel gas pipings 68a and 68b. The third gas flow rate control valve 56 is actuated by a signal from the controller 90.

The first cathode off-gas line 64 comprises air pipings 64a and 64b for communicating an outlet side of the back pressure valve 32 in the air supply loop 30 with the mixer 52 and a gas/water separator 57 provided between the air pipings 64a and 64b. The gas/water separator 57 is a plate type similar to the gas/water separator 53; separates a moisture in a cathode off-gas flowing in from the air piping 64a (that is, a cathode 12 side) by a separation plate; makes the cathode off-gas, from which the moisture is removed, flow in the air piping 64b (that is, a mixer 52 side); and makes a cathode off-gas containing the moisture flow in an air piping 78a described later (that is, a dilution device 71 side). At the air piping 64b is placed a flowmeter 58 for detecting a cathode off-gas supply amount $Q_{OH}$ to the mixer 52 (that is, the combustion heater 51).

The warm-up coolant line 69 comprises a coolant piping 69a for supplying a coolant supplied to the combustion heater 51 from the three-directional solenoid valve 44 and a coolant piping 69b for supplying a coolant heated by the combustion heater 51 to the fuel cell 10.

The dilution loop 70 comprises the dilution device 71 connected to the combustion heater 51 and takes charge of diluting the anode off-gas and a discharge gas of the combustion heater 51 within the dilution device 71 by an oxygen containing gas and of discharging them in the atmosphere. The dilution device 71 comprises a storage room 71b and diffusion room 71c comparted by a porous plate 71a. The anode off-gas flowing in the storage room 71b gradually flows in the diffusion room 71c through the porous plate 71a, is diluted by mixing with an oxygen containing gas in the diffusion room 71c, and then is discharged in the atmosphere.

The dilution loop 70 comprises a second fuel gas line (second path) 79 for leading the anode off-gas to the dilution device 71 and a second cathode off-gas line 78 for leading the cathode off-gas to the dilution device 71.

The second fuel gas line 79 comprises fuel gas pipings 79a and 79b for communicating the gas/water separator 53 with the storage room 71b of the dilution device 71 and a second gas flow rate control valve (second flow rate adjustment mechanism, anode off-gas discharge mechanism) 72 provided between the fuel gas pipings 79a and 79b. The second gas flow rate control valve 72 is actuated by a signal from the controller 90.

The second cathode off-gas line 78 comprises air pipings 78a and 78b for communicating the gas/water separator 57 with the dilution device 71 and an orifice 73 provided between the air pipings 78a and 78b.

First Embodiment

Here will be described in detail a procedure of warm-up control in a first embodiment, referring the flowchart of FIG. 4 (see FIG. 2 as needed).

Figure 4:
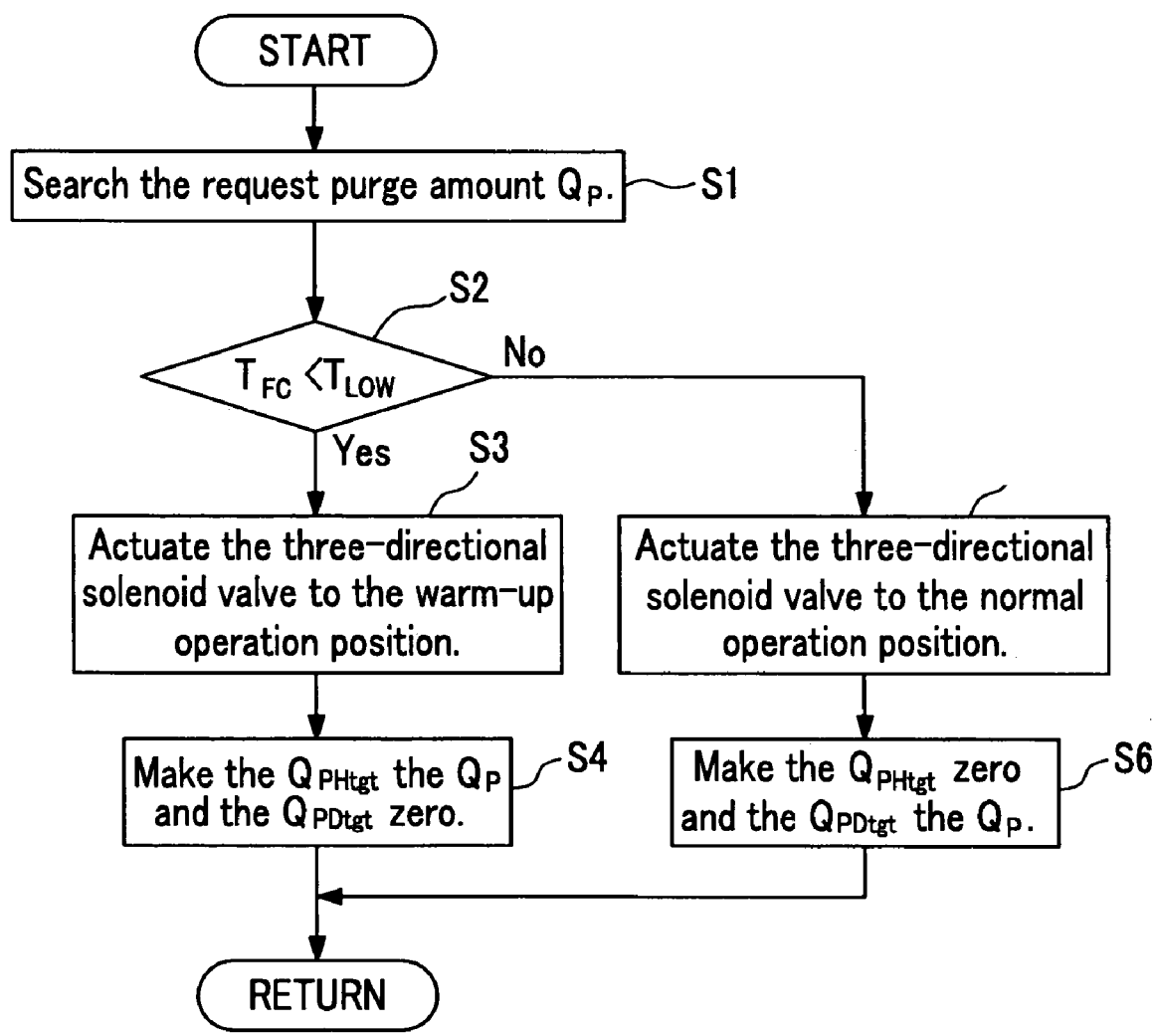
FIG. 4 is a flowchart showing a procedure of warm-up control in a first embodiment of the present invention.

If an ignition switch (not shown) of the vehicle V (see FIG. 1) is made ON by a driver, the controller 90 performs the warm-up control shown in FIG. 4. Firstly in a step S1, the controller 90 searches a request purge amount $Q_P$ of the fuel cell 10 from a request purge amount map not shown, based on an operation state (a power generation state of the fuel cell 10, a fuel cell temperature, an anode gas temperature, and the like) of the fuel cell system F1. The request purge amount $Q_P$ is an amount of an anode off-gas necessary for removing water and impurities, which are accumulated in the anode 11 and the fuel pipings 29c to 29f, and the amount $Q_P$ becomes a continuously and comparatively large value directly after a start-up in order to remove water and impurities accumulated during a stop. In addition, if predetermined time lapses after the start-up, the request purge amount $Q_P$ becomes a intermittently and comparatively small value in order to remove water and impurities accumulated by an operation.

If obtaining the request purge amount $Q_P$ in the step S1, next in a step S2 the controller 90 determines whether or not a fuel cell temperature $T_{FC}$ detected by the temperature sensor 45 is lower than a warm-up request temperature $T_{LOW}$ (for example, 30 degrees Celsius).

If the fuel cell temperature $T_{FC}$ is lower than the warm-up request temperature $T_{LOW}$ and the determination of the step S2 is Yes, in a step S3 the controller 90 actuates the three-directional solenoid 44 to a warm-up operation position of supplying a coolant from the water pump 43 to the combustion heater 51. After then, in a step S4 the controller 90 makes a target fuel introduction amount $Q_{PHtgt}$ into the combustion heater 51 the request purge amount $Q_P$ and a target fuel introduction amount $Q_{PDtgt}$ into the dilution device 71 zero.

Thus the first gas flow rate control valve 54 is opened, and on the other hand, the second gas flow rate control valve 72 is closed; in the mixer 52 flow a total amount of the anode off-gas purged from the anode 11 and a substantially total amount of the cathode off-gas discharged from the cathode 12. Meanwhile, although the cathode off-gas also flows in the dilution device 71 from the gas/water separator 57 through the second cathode off-gas line 78, the flow-in amount becomes a very small value because the orifice 73 is provided in the line 78. And the cathode off-gas gradually flows in the air piping 78a together with a moisture separated by the gas/water separator 57 and carries the moisture to the dilution device 71 from the gas/water separator 57.

The anode off-gas and the cathode off-gas are mixed within the mixer 52, then flow in the combustion heater 51, combust within the combustion heater 51, and produce a thermal energy. The thermal energy of the combustion heater 51 is supplied to the fuel cell 10 through the warm-up coolant line 69 and the coolant pipings 49a to 49f and makes the fuel cell temperature $T_{FC}$ rise. At this time, because a moisture contained in the anode off-gas is separated by the gas/water separator 53 and a moisture contained in the cathode off-gas is separated by the gas/water separator 57, an anode off-gas and cathode off-gas not containing a moisture are supplied to the combustion heater 51, and thereby a combustion stability is improved. Because the embodiment combusts an anode off-gas conventionally discharged and performs the warm-up, a fuel consumption amount lowers.

If the fuel cell temperature $T_{FC}$ reaches the warm-up request temperature $T_{LOW}$ and the determination of the step S2 is No, in a step S5 the controller 90 actuates the three-directional solenoid 44 to a normal operation position of supplying the coolant from the water pump 43 directly to the fuel cell 10. After then, in a step S6 the controller 90 makes the target fuel introduction amount $Q_{PHtgt}$ into the combustion heater 51 zero and the target fuel introduction amount $Q_{PDtgt}$ into the dilution device 71 the request purge amount $Q_P$.

Thus the first gas flow rate control valve 54 is closed, and on the other hand, the second gas flow rate control valve 72 is opened; a supply destination of the anode off-gas changes from the mixer 52 to the dilution device 71. As a result, the combustion in the combustion heater 51 stops, and the total amount of the anode off-gas is diluted to a concentration (for example, 2%) not more than a combustible limit within the dilution device 71 by the cathode off-gas and then is discharged in the atmosphere.

Second Embodiment

Here will be described in detail a procedure of warm-up control in a second embodiment, referring the flowchart of FIG. 5 (see FIG. 2 as needed). The second embodiment is different from the first embodiment in decreasing an amount of the anode off-gas supplied to the combustion heater 51 and supplying the amount of the anode off-gas to the dilution device 71 when the request purge amount $Q_P$ is too much.

Figure 5:
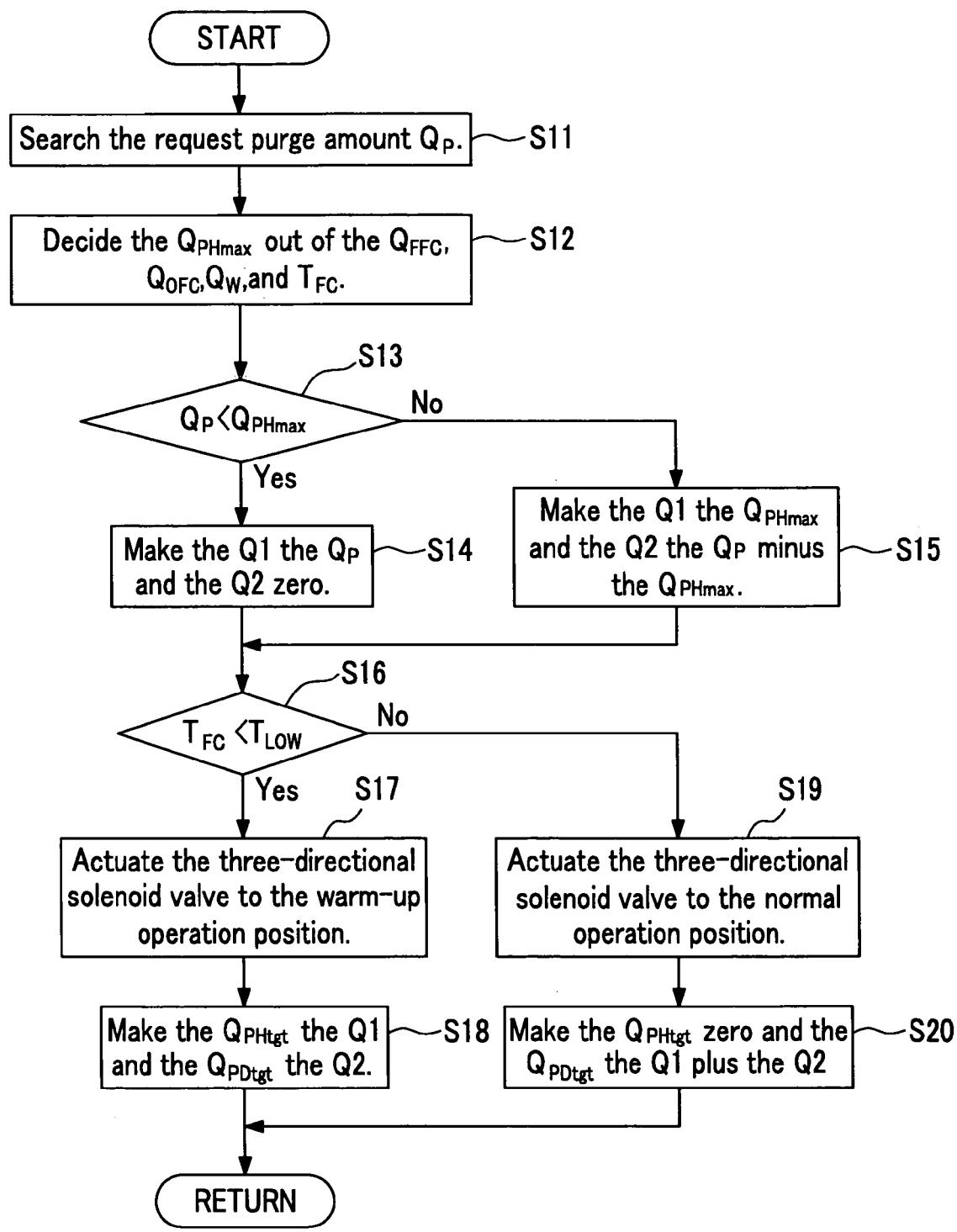
FIG. 5 is a flowchart showing a procedure of warm-up control in a second embodiment of the present invention.

If an ignition switch of the vehicle V (see FIG. 1) is made ON by a driver, the controller 90 performs the warm-up control shown in FIG. 5. Firstly in a step S11, the controller 90 searches the request purge amount $Q_P$ of the fuel cell 10 from a request purge amount map not shown, based on an operation state of the fuel cell system F1.

If obtaining the request purge amount $Q_P$ in the step S11, next in a step S12 the controller 90 searches a fuel supply limit amount $Q_{PHmax}$ to the combustion heater 51 from a fuel supply limit amount map not shown, based on a supply hydrogen amount $Q_{FFC}$ to the anode 11 detected by the flowmeter 26, a supply air amount $Q_{OFC}$ to the cathode 12 detected by the flowmeter 34, the fuel cell temperature $T_{FC}$ detected by the temperature sensor 45, and a coolant flow rate $Q_W$ detected by the flowmeter 46. The fuel supply limit amount $Q_{PHmax}$ becomes small when the fuel cell temperature $T_{FC}$ already rises to some extent, a supply heat amount from the combustion heater 51 becomes too large, and there exists a possibility of the temperature $T_{FC}$ overshooting a target temperature.

If obtaining the fuel supply limit amount $Q_{PHmax}$ in the step S12, next in a step S13 the controller 90 determines whether or not the request purge amount $Q_P$ is smaller than the fuel supply limit amount $Q_{PHmax}$. And if the determination is Yes, in a step S14 the controller 90 makes a first fuel supply amount Q1 the request purge amount $Q_P$ and a second fuel supply amount Q2 zero. In addition, the determination of the step S13 is No, in a step S15 the controller 90 makes the first fuel supply amount Q1 the fuel supply limit amount $Q_{PHmax}$ and the second fuel supply amount Q2 a value obtained by subtracting the fuel supply limit amount $Q_{PHmax}$ from the request purge amount $Q_P$.

In the steps S14 and S15, if setting the first and second fuel supply amounts Q1 and Q2, in a step S16 the controller 90 determines whether or not the fuel cell temperature $T_{FC}$ detected by the temperature sensor 45 is lower than the warm-up request temperature $T_{LOW}$.

If the fuel cell temperature $T_{FC}$ is lower than the warm-up request temperature $T_{LOW}$ and the determination of the step S16 is Yes, in a step S17 the controller 90 actuates the three-directional solenoid valve 44 to a warm-up operation position where a coolant from the water pump 43 is supplied to the combustion heater 51. After then, in a step S18 the controller 90 makes the target fuel introduction amount $Q_{PHtgt}$ into the combustion heater 51 the first fuel supply amount Q1 and the target fuel introduction amount $Q_{PDtgt}$ into the dilution device 71 the second fuel supply amount Q2.

Thus the first gas flow rate control valve 54 is actuated to an open side, and on the other hand, the second gas flow rate control valve 72 is actuated to a close side; in the mixer 52 flow an anode off-gas purged from the anode 11 in a range of not exceeding the fuel supply limit amount $Q_{PHmax}$ and a cathode off-gas discharged from the cathode 12. In addition, in the dilution device 71 flows an anode off-gas exceeding the fuel supply limit amount $Q_{PHmax}$, and the anode off-gas is diluted by the cathode off-gas and then is discharged in the atmosphere.

Same as in the first embodiment, the anode off-gas and the cathode off-gas are mixed within the mixer 52, then flow in the combustion heater 51, combust within the combustion heater 51, and produce a thermal energy. The thermal energy of the combustion heater 51 is supplied to the fuel cell 10 through the warm-up coolant line 69 and the coolant pipings 49a to 49f and makes the fuel cell temperature $T_{FC}$ rise. Because in the second embodiment the anode off-gas supply amount is made not to exceed the fuel supply limit amount $Q_{PHmax}$, an overshoot of the fuel cell temperature $T_{FC}$ from a target temperature is prevented.

If the fuel cell temperature $T_{FC}$ reaches the warm-up request temperature $T_{LOW}$ and the determination of the step S16 is No, in a step S19 the controller 90 actuates the three-directional solenoid 44 to a normal operation position of supplying the coolant from the water pump 43 directly to the fuel cell 10. After then, in a step S20 the controller 90 makes the target fuel introduction amount $Q_{PHtgt}$ into the combustion heater 51 zero and the target fuel introduction amount $Q_{PDtgt}$ into the dilution device 71 a value obtained by adding the first and second fuel supply amounts Q1 and Q2 (that is, the request purge amount $Q_P$).

Thus the first gas flow rate control valve 54 is closed, and on the other hand, the second gas flow rate control valve 72 is opened; a supply destination of the anode off-gas changes from the mixer 52 to the dilution device 71. As a result, the combustion in the combustion heater 51 stops, and a total amount of the anode off-gas is diluted to a concentration (for example, 2%) not more than a combustible limit within the dilution device 71 by the cathode off-gas and then is discharged in the atmosphere.

Third Embodiment

Here will be described in detail a procedure of warm-up control in a third embodiment, referring the flowchart of FIG. 6 (see FIG. 2 as needed). The third embodiment is different from the first embodiment in increasing air supplied to the fuel cell 10 from the air pump 31 when an amount of the cathode off-gas supplied to the combustion heater 51 is less than that of the anode off-gas supplied thereto.

Figure 6:
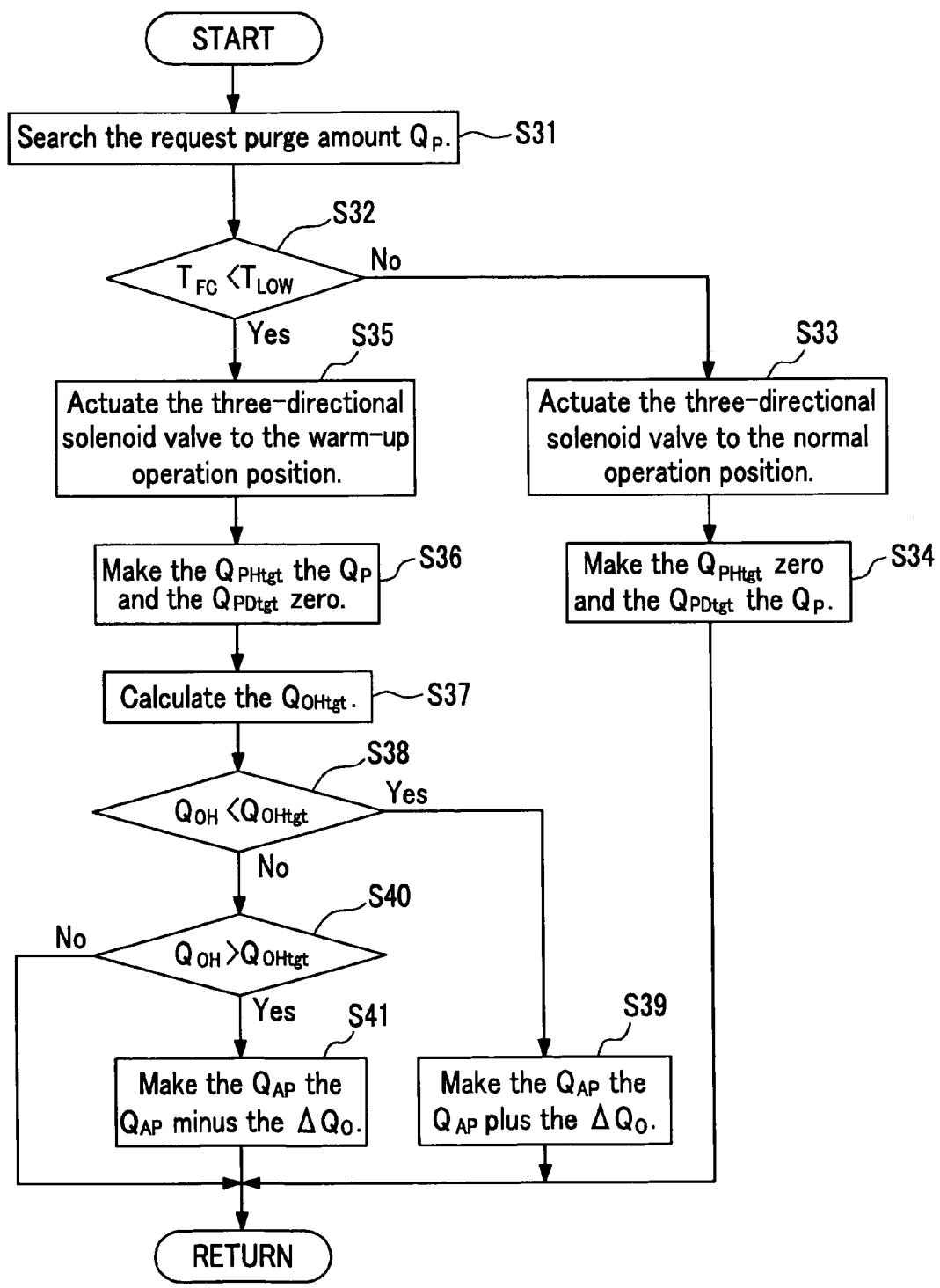
FIG. 6 is a flowchart showing a procedure of warm-up control in a third embodiment of the present invention.

If an ignition switch of the vehicle V (see FIG. 1) is made ON by a driver, the controller 90 performs the warm-up control shown in FIG. 6. Firstly in a step S31, the controller 90 searches the request purge amount $Q_P$ of the fuel cell 10 from a request purge amount map not shown, based on an operation state of the fuel cell system F1.

If obtaining the request purge amount $Q_P$ in the step S31, next in a step S32 the controller 90 determines whether or not the fuel cell temperature $T_{FC}$ detected by the temperature sensor 45 is lower than the warm-up request temperature $T_{LOW}$.

If the fuel cell temperature $T_{FC}$ is higher than the warm-up request temperature $T_{LOW}$ and the determination of the step S32 is No, in a step S33 the controller 90 actuates the three-directional solenoid valve 44 to a normal operation position where a coolant from the water pump 43 is supplied directly to the fuel cell 10. After then, in a step S34 the controller 90 makes the target fuel introduction amount $Q_{PHtgt}$ into the combustion heater 51 zero and the target fuel introduction amount $Q_{PDtgt}$ into the dilution device 71 the request purge amount $Q_P$.

Thus the first gas flow rate control valve 54 and the first air flow rate control valve 57 are closed, and on the other hand, the second gas flow rate control valve 72 and the second air flow rate control valve 73 are opened; an anode off-gas and cathode off-gas are supplied to the dilution device 71. And a total amount of the anode off-gas is diluted to a concentration (for example, 2%) not more than a combustible limit within the dilution device 71 by the cathode off-gas and then is discharged in the atmosphere.

On the other hand, if the fuel cell temperature $T_{FC}$ is lower than the warm-up request temperature $T_{LOW}$ and the determination of the step S32 is Yes, in a step S35 the controller 90 actuates the three-directional solenoid valve 44 to a warm-up operation position where the coolant from the water pump 43 is supplied to the combustion heater 51. After then, in a step S36 the controller 90 makes the target fuel introduction amount $Q_{PHtgt}$ into the combustion heater 51 the request purge amount $Q_P$ and the target fuel introduction amount $Q_{PDtgt}$ into the dilution device 71 zero.

Thus same as in the first embodiment, the first gas flow rate control valve 54 is opened, and on the other hand, the second gas flow rate control valve 72 is closed; in the mixer 52 flow a total amount of the anode off-gas purged from the anode 11 and a substantially total amount of the cathode off-gas discharged from the cathode 12.

The anode off-gas and the cathode off-gas are mixed within the mixer 52, then flow in the combustion heater 51, combust within the combustion heater 51, and produce a thermal energy. The thermal energy of the combustion heater 51 is supplied to the fuel cell 10 through the warm-up coolant line 69 and the coolant pipings 49a to 49f and makes the fuel cell temperature $T_{FC}$ rise.

Next, in a step S37 the controller 90 calculates a target oxygen introduction amount $Q_{OHtgt}$ for combusting hydrogen of the target fuel introduction amount $Q_{PHtgt}$, using a predetermined calculation formula. After then, the controller 90 determines whether or not the cathode off-gas supply amount $Q_{OH}$ to the combustion heater 51 detected by the flowmeter 58 is less than the target oxygen introduction amount $Q_{OHtgt}$, and if the determination is Yes, in a step S39 the controller 90 increases an air discharge rate $Q_{AP}$ of the air pump 31 by a predetermined amount $\Delta Q_O$.

On the other hand, if the determination of the step S38 is No, in a step S40 the controller 90 determines whether or not the cathode off-gas supply amount $Q_{OH}$ to the combustion heater 51 detected by the flowmeter 58 is more than the target oxygen introduction amount $Q_{OHtgt}$, and if the determination is Yes, in a step S41 the controller 90 decreases the air discharge rate $Q_{AP}$ of the air pump 31 by the predetermined amount $\Delta Q_O$. Meanwhile, if the determinations of the steps S38 and S40 are both No (that is, when the cathode off-gas supply amount $Q_{OH}$ and the target oxygen introduction amount $Q_{OHtgt}$ coincide), the air discharge rate $Q_{AP}$ of the air pump 31 does not change.

Thus the target oxygen introduction amount $Q_{OHtgt}$ to the combustion heater 51 results in being adjusted to a just enough value, and thereby combustion in an adequate mixture ratio is realized within the combustion heater 51.

Fourth Embodiment

Here will be described in detail a procedure of warm-up control in a fourth embodiment, referring the flowchart of FIG. 7 (see FIG. 2 as needed). The fourth embodiment is different from the first embodiment in supplying hydrogen of a fuel gas to the combustion heater 51 when an amount of the anode off-gas necessary for a warm-up by the combustion heater 51 is not obtained in extreme cold and the like.

Figure 7:
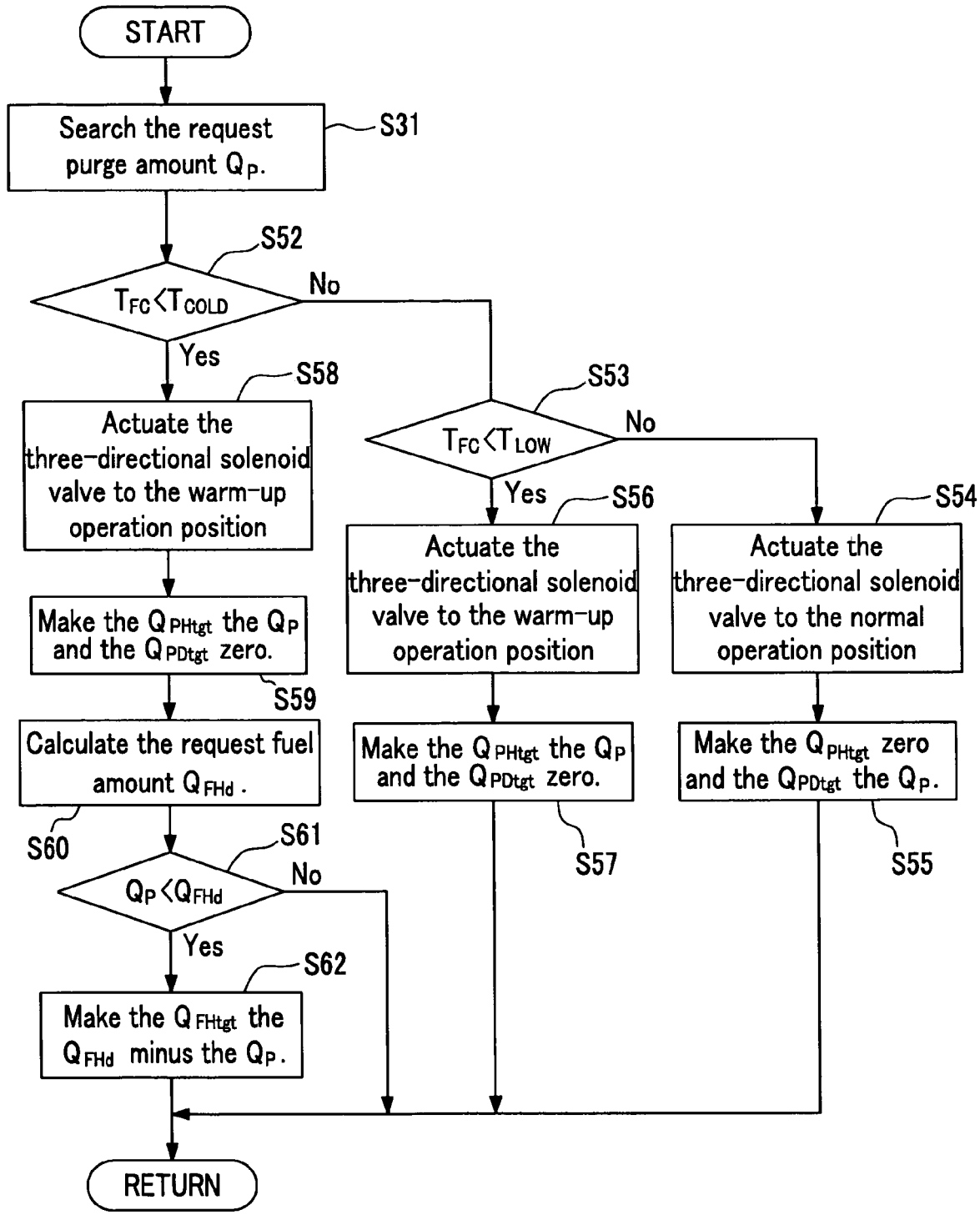
FIG. 7 is a flowchart showing a procedure of warm-up control in a fourth embodiment of the present invention.

If an ignition switch of the vehicle V (see FIG. 1) is made ON by a driver, the controller 90 performs the warm-up control shown in FIG. 7. Firstly in a step S51, the controller 90 searches the request purge amount $Q_P$ of the fuel cell 10 from a request purge amount map not shown, based on an operation state of the fuel cell system F1.

If obtaining the request purge amount $Q_P$ in the step S51, next in a step S52 the controller 90 determines whether or not the fuel cell temperature $T_{FC}$ detected by the temperature sensor 45 is lower than a cold fuel cell temperature $T_{COLD}$ (for example, 0 degree Celsius).

If the fuel cell temperature $T_{FC}$ is higher than the cold fuel cell temperature $T_{COLD}$ and the determination of the step S52 is No, in a step S53 the controller 90 determines whether or not the fuel cell temperature $T_{FC}$ is lower than the warm-up request temperature $T_{LOW}$ (for example, 30 degrees Celsius).

If the fuel cell temperature $T_{FC}$ is higher than the cold fuel cell temperature $T_{COLD}$ and the determination of the step S53 is No, in a step S54 the controller 90 actuates the three-directional solenoid valve 44 to a normal operation position where a coolant from the water pump 43 is supplied directly to the fuel cell 10. After then, in a step S55 the controller 90 makes the target fuel introduction amount $Q_{PHtgt}$ into the combustion heater 51 zero and the target fuel introduction amount $Q_{PDtgt}$ into the dilution device 71 the request purge amount $Q_P$.

Thus the first gas flow rate control valve 54 is closed, and on the other hand, the second gas flow rate control valve 72 is opened; the anode off-gas is supplied to the dilution device 71. And a total amount of the anode off-gas is diluted to a concentration (for example, 2%) not more than a combustible limit within the dilution device 71 by the cathode off-gas and then is discharged in the atmosphere.

If the fuel cell temperature $T_{FC}$ exists between the cold fuel cell temperature $T_{COLD}$ and the warm-up request temperature $T_{LOW}$ and the determination of the step S53 is Yes, in a step S56 the controller 90 actuates the three-directional solenoid valve 44 to a warm-up operation position where the coolant from the water pump 43 is supplied to the combustion heater 51. After then, in a step S57 the controller 90 makes the target fuel introduction amount $Q_{PHtgt}$ into the combustion heater 51 the request purge amount $Q_P$ and the target fuel introduction amount $Q_{PDtgt}$ into the dilution device 71 zero.

Thus same as in the first embodiment, the first gas flow rate control valve 54 is opened, and on the other hand, the second gas flow rate control valve 72 is closed; in the mixer 52 flow a total amount of the anode off-gas purged from the anode 11 and a substantially total amount of the cathode off-gas discharged from the cathode 12.

The anode off-gas and the cathode off-gas are mixed within the mixer 52, then flow in the combustion heater 51, combust within the combustion heater 51, and produce a thermal energy. The thermal energy of the combustion heater 51 is supplied to the fuel cell 10 through the warm-up coolant line 69 and the coolant pipings 49a to 49f and makes the fuel cell temperature $T_{FC}$ rise.

On the other hand, if the fuel cell temperature $T_{FC}$ is lower than the cold fuel cell temperature $T_{COLD}$ in extreme cold and the like and the determination of the step S52 is Yes, in a step S58 the controller 90 actuates the three-directional solenoid valve 44 to the warm-up operation position where the coolant from the water pump 43 is supplied to the combustion heater 51. After then, in a step S59 the controller 90 makes the target fuel introduction amount $Q_{PHtgt}$ into the combustion heater 51 the request purge amount $Q_P$ and the target fuel introduction amount $Q_{PDtgt}$ into the dilution device 71 zero.

Thus same as in the first embodiment, the first gas flow rate control valve 54 is opened, and on the other hand, the second gas flow rate control valve 72 is closed; in the mixer 52 flow a total amount of the anode off-gas purged from the anode 11 and a substantially total amount of the cathode off-gas discharged from the cathode 12.

The anode off-gas and the cathode off-gas are mixed within the mixer 52, then flow in the combustion heater 51, combust within the combustion heater 51, and produce a thermal energy. The thermal energy of the combustion heater 51 is supplied to the fuel cell 10 through the warm-up coolant line 69 and the coolant pipings 49a to 49f.

Next, in a step S60 the controller 90 searches a request fuel amount $Q_{FHd}$ of the combustion heater 51 from a request fuel amount map not shown, based on an operation state of the fuel cell system F1. The request fuel amount $Q_{FHd}$ is a value (fuel supply upper limit amount to the combustion heater 51) for making the fuel cell temperature $T_{FC}$ rise till a predetermined value in a short period of time as much as possible in a range of not obstructing an operation (power generation) of the fuel cell system F1.

If obtaining the request fuel amount $Q_{FHd}$ in the step S60, in a step S61 the controller 90 determines whether or not the request purge amount $Q_P$ is less than the request fuel amount $Q_{FHd}$; if the determination is No, the controller 90 returns to the start and repeats the control.

If the request purge amount $Q_P$ is less than request fuel amount $Q_{FHd}$ and the determination of the step S61 is Yes, in a step S62 the controller 90 subtracts the request purge amount $Q_P$ from the request fuel amount $Q_{FHd}$ and obtains the target hydrogen introduction amount $Q_{FHtgt}$. Meanwhile, the target hydrogen introduction amount $Q_{FHtgt}$ is a hydrogen amount directly introduced into the combustion heater 51 from the high pressure hydrogen tank 21.

Thus the third gas flow rate control valve 56 is actuated in a valve opening direction by a predetermined amount, and hydrogen of the high pressure hydrogen tank 21 is introduced into the mixer 52 through the third fuel gas line 68 and the fuel piping 67c. As a result, fuel of the request fuel amount $Q_{FHd}$ is supplied to the combustion heater 51, and the warm-up of the fuel cell 10 is speedily performed in a range of not obstructing an operation thereof.

[Lapse of Fuel Supply]

Here will be described a lapse of a fuel supply in a warm-up of the fuel cell system F1 of an embodiment of the present invention, referring the time chart of FIG. 8. Meanwhile, the time chart of FIG. 8 is one where fuel supply control of the second embodiment is partially added to that of the fourth embodiment.

When starting the fuel cell 10 in extreme cold (for example, minus several tens degrees Celsius), it is necessary to speedily make the fuel cell temperature $T_{FC}$ rise in order to realize a stable power generation. Consequently, the fourth embodiment sets the request fuel amount $Q_{FHd}$ (fuel supply upper limit amount to the combustion heater 51 in a range of not obstructing an operation of the fuel cell system F1) and directly supplies a hydrogen amount (amount shown by hatching in FIG. 8), which is obtained by subtracting the request purge amount $Q_P$ (anode off-gas supply amount) from the request fuel amount $Q_{FHd}$, to the combustion heater 51 from the high pressure hydrogen tank 21.

In the fuel cell system F1, because a purge is intermittently performed depending an operation state thereof, an anode off-gas supply amount repeats an increase/decrease. However, the fourth embodiment directly supplies hydrogen to the combustion heater 51 from the high pressure hydrogen tank 21, thereby enlarges a combustion energy of the combustion heater 51 in a range of not obstructing the operation of the fuel cell system F1, and can make the fuel cell temperature $T_{FC}$ speedily reach the cold fuel cell temperature $T_{COLD}$ (for example, 0 degree Celsius).

Figure 8:
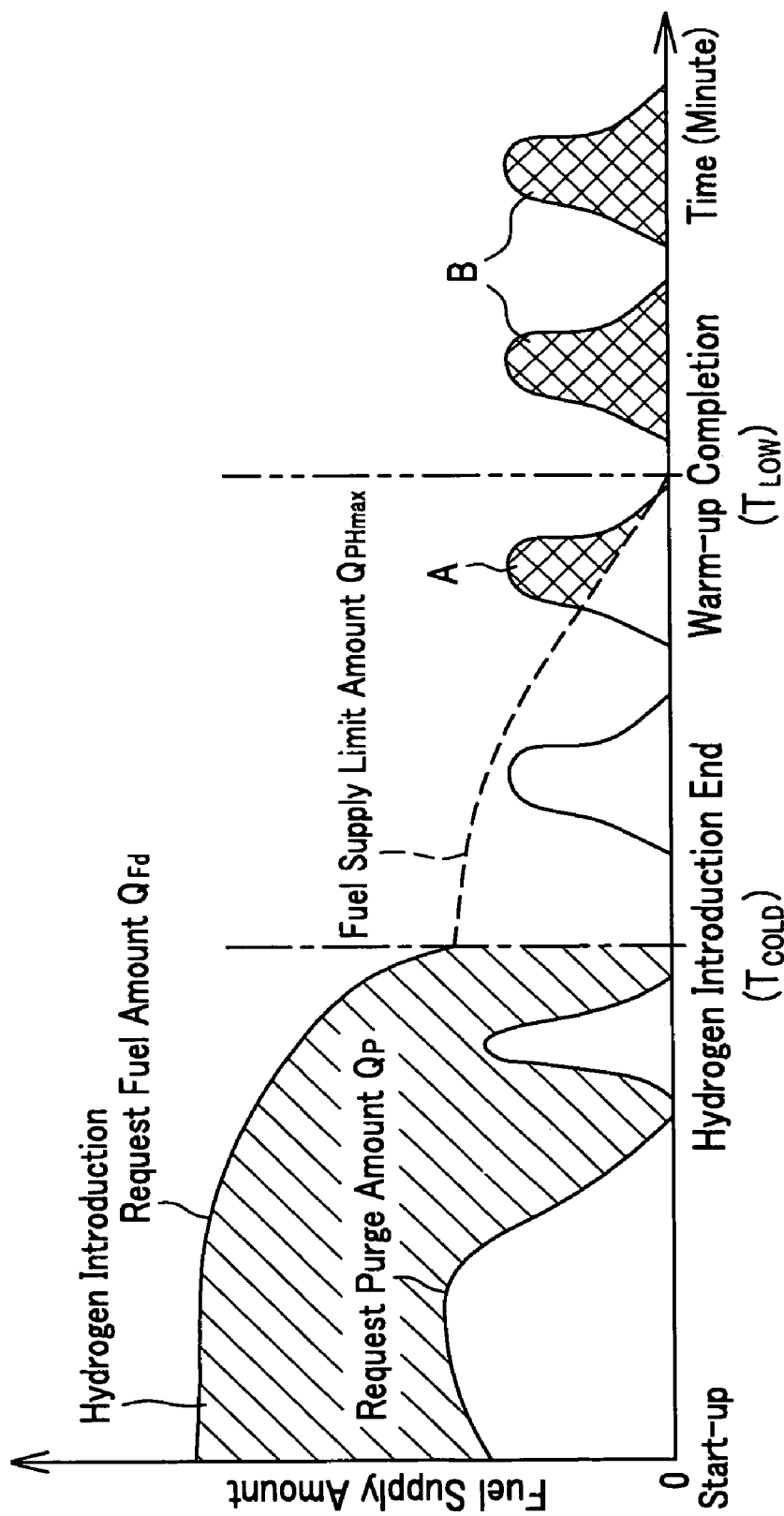
FIG. 8 is a time chart showing a lapse of a fuel supply in a warm-up of an embodiment of the present invention.

If time lapses from the timing of the start in the time chart of FIG. 8 and the fuel cell temperature $T_{FC}$ reaches the cold fuel cell temperature $T_{COLD}$ (dashed line shown in FIG. 8), it becomes unnecessary to directly supply hydrogen to the combustion heater 51 from the high pressure hydrogen tank 21 because the fuel cell 10 can warm up by itself (warm up with heat produced by a power generation). On the contrary, when a total amount of the anode off-gas is combusted by the combustion heater 51, there occurs a possibility of the fuel cell temperature $T_{FC}$ overshooting the target temperature. Consequently, the second embodiment sets the fuel supply limit amount $Q_{PHmax}$ to the combustion heater 51, based on the supply hydrogen amount $Q_{FFC}$, the supply air amount $Q_{OFC}$, the fuel cell temperature $T_{FC}$, and the coolant flow rate $Q_W$ to the fuel cell 10, and supplies an anode off-gas (amount shown with a cross-hatching A in FIG. 8) exceeding the fuel supply limit amount $Q_{PHmax}$ to the dilution device 71.

In the fuel cell system F1, as described above, the anode off-gas supply amount repeats the increase/decrease. However, because the second embodiment makes the anode off-gas supply amount not exceeding the fuel supply limit amount $Q_{PHmax}$ combust by the combustion heater 51, the embodiment can enlarge a combustion energy of the combustion heater 51 in a range of the fuel cell temperature $T_{FC}$ not overshooting the target temperature, and can make the fuel cell temperature $T_{FC}$ speedily reach the warm-up request temperature $T_{LOW}$ (for example, 30 degrees Celsius) (line shown with a chain double-dashed line in FIG. 8).

If the fuel cell temperature $T_{FC}$ reaches the warm-up request temperature $T_{LOW}$ and the warm-up of the fuel cell 10 is completed, a total amount (amount shown with cross-hatchings B in FIG. 8) of the anode off-gas is supplied to the dilution device 71, and a hydrogen containing concentration is diluted so as to become not more than a combustible limit and the anode off-gas is discharged in the atmosphere.

<Variation Example of Gas/Air Separator>

Next will be described a variation example of a gas/air separator, referring to FIGS. 9 and 10.

Figure 9:
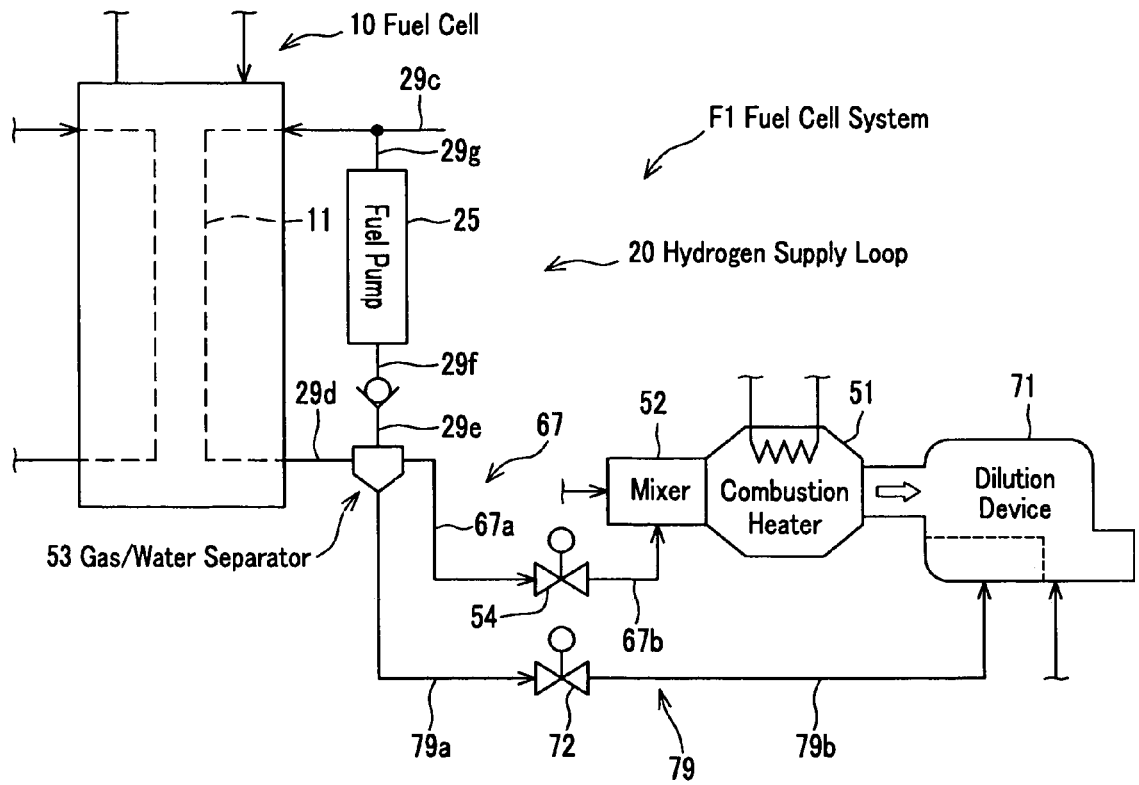
FIG. 9 is a configuration block diagram showing a substantial part of a fuel cell system related to a variation example of a gas/water separator.
Figure 10:
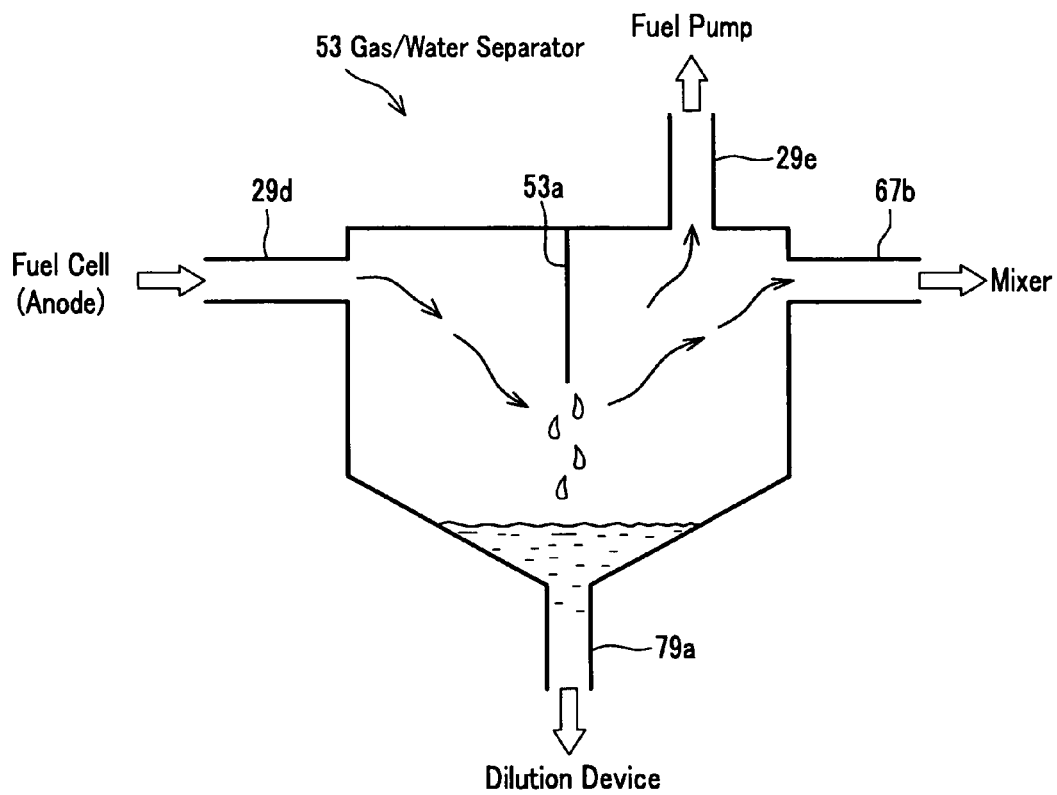
FIG. 10 is a vertical section drawing related to a variation example.

As shown in FIGS. 9 and 10, a variation example of the fuel cell system F1 comprises the gas/air separator 53 between the fuel gas pipings 29d and 29e of the hydrogen supply loop 20. Therefore, a total amount of hydrogen passing through the anode 11 flows in the gas/air separator 53, and a moisture contained in hydrogen is always removed from the gas/air separator 53 in an operation of the fuel cell 10. And a moisture removed from the gas/air separator 53 is introduced into the dilution device 71 together with an anode off-gas in sweeping the fuel cell 10. Thus in the variation example, because the moisture in the hydrogen is designed to be removed not only in the sweeping but also in the normal operation, it becomes difficult for an accumulation of the moisture to occur in the anode 11.

The present invention can be performed in a wide variation without being limited by the embodiments. For example, although the embodiments are described making a PEM type of a fuel cell an example, they are not limited to the PEM type. In addition, although the embodiments apply the present invention to a fuel cell system for recirculating an anode off-gas to a fuel cell, the present invention can be applied to a fuel cell system for not recirculating the anode off-gas. In addition, although the embodiments are described making a fuel cell electric vehicle an example, the present invention can be applied to such a fuel cell system for a ship and a constantly placed power generation. In addition, although the third embodiment is designed to introduced new air from an air pump into a combustion heater when an amount of the cathode off-gas is less than that of the anode off-gas supplied to the combustion heater, a coolant amount introduced into the combustion heater may be set depending on the amount of the anode off-gas. In addition, although each of the embodiments describes an example of introducing a cathode off-gas as an oxygen containing gas into the combustion heater, an oxidizer gas (new air) may be designed to be introduced into the combustion heater instead of the cathode off-gas. In addition, although the embodiments are designed to comprise an orifice in a second cathode off-gas line, they may be designed to comprise any of a solenoid valve (ON/OFF valve) and an electric actuation valve instead of the orifice. In addition, commencing with a layout of pipings, flow rate control valves, and the like configuring a fuel cell system, without departing the spirit and scope of the invention are also appropriately changeable gas/water separators, a concrete structure of a combustion heater, a concrete procedure of a warm-up, and the like.

What is claimed is:

1. A fuel cell system comprising:
   a fuel cell for generating power by chemically reacting a fuel gas supplied to an anode and an oxygen containing gas supplied to a cathode;
   an anode off-gas discharge mechanism for discharging an anode off-gas from said anode;
   a combustion heater for combusting a combustion gas wherein the combustion gas is at least one of either said anode off-gas or said fuel gas together with the oxygen containing gas, using a thermal energy obtained by the combustion, and heating said fuel cell;
   a dilution mechanism for diluting said anode off-gas by said oxygen containing gas;
   a first path for introducing said anode off-gas into said combustion heater;
   a first flow rate adjustment mechanism for adjusting an introduction amount of said anode off-gas into said first path;
   a second path for introducing said anode off-gas into said dilution mechanism;
   a second flow rate adjustment mechanism for adjusting an introduction amount of said anode off-gas into said second path;
   a third path for introducing said fuel gas into said combustion heater; and
   a third flow rate adjustment mechanism for adjusting an introduction amount of said fuel gas into said third path; and
   a control mechanism for controlling actuations of said first flow rate adjustment mechanism, of said second flow rate adjustment mechanism, and of said third flow rate adjustment mechanism.

2. A fuel cell system according to claim 1, the system further comprising:
   a temperature detection mechanism for detecting a temperature of said fuel cell,
   wherein when the temperature of said fuel cell is lower than a first predetermined temperature, said control mechanism makes an introduction amount of said anode off-gas into said first path more than that into said second path, and
   wherein when the temperature of said fuel cell is higher than the first predetermined temperature, said control mechanism makes an introduction amount of said anode off-gas into said second path more than that into said first path.

3. A fuel cell system according to claim 1, the system further comprising:
   a fuel supply limit amount set mechanism for setting a limit value of an introduction amount of said anode off-gas into said first path,
   wherein when an anode off-gas discharge amount by said anode off-gas discharge mechanism exceeds said limit value, said control mechanism introduces an amount of an anode off-gas obtained by subtracting the limit amount from the discharge amount into said dilution mechanism.

4. A fuel cell system according to claim 1, the system further comprising:
a request supply amount set mechanism for setting a request supply amount of a combustion gas to said combustion heater,
wherein when an anode off-gas discharge amount by said anode off-gas discharge mechanism does not satisfy said request supply amount, said control mechanism introduces a fuel gas amount obtained by subtracting the discharge amount from the request supply amount into said third path.

5. A fuel cell system according to claim 1, wherein any of a flow rate of said oxygen containing gas supplied to said combustion heater and a refrigerant flow rate of a fuel cell cooling loop heated by the combustion heater is set, based on any of a request supply amount and actual flow rate of a combustion gas to the combustion heater.

6. A fuel cell system according to claim 1 that further comprises at least one of a gas/water separator for removing a moisture in said anode off-gas introduced into said combustion heater or another gas/water separator for removing a moisture in said oxygen containing gas introduced into said combustion heater.

* * * * *